United States Patent
Yoon et al.

(10) Patent No.: US 10,545,663 B2
(45) Date of Patent: Jan. 28, 2020

(54) METHOD FOR CHANGING AN INPUT MODE IN AN ELECTRONIC DEVICE

(71) Applicant: Samsung Electronics Co., Ltd., Gyeonggi-do (KR)

(72) Inventors: Sung-Jin Yoon, Gyeonggi-do (KR); Pyo-Je Cho, Gyeonggi-do (KR); Yoo-Jin Hong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 664 days.

(21) Appl. No.: 14/546,547

(22) Filed: Nov. 18, 2014

(65) Prior Publication Data

US 2015/0143277 A1 May 21, 2015

(30) Foreign Application Priority Data

Nov. 18, 2013 (KR) .......................... 10-2013-0139939

(51) Int. Cl.
G06F 3/048 (2013.01)
G06F 3/0488 (2013.01)

(52) U.S. Cl.
CPC ................. G06F 3/04886 (2013.01)

(58) Field of Classification Search
CPC ........................................... G06F 3/0481–0489
See application file for complete search history.

(56) References Cited

U.S. PATENT DOCUMENTS

| | | | | |
|---|---|---|---|---|
| 5,825,352 A * | 10/1998 | Bisset | .............. | G06F 3/044 345/157 |
| 5,835,079 A * | 11/1998 | Shieh | .............. | G06F 3/0488 345/156 |
| 5,971,636 A * | 10/1999 | Mensick | .............. | G06F 3/0219 400/486 |
| 6,614,422 B1 * | 9/2003 | Rafii | .............. | G06F 1/1626 345/156 |
| 7,088,342 B2 * | 8/2006 | Rekimoto | .............. | G06F 3/0488 345/169 |
| 7,289,645 B2 * | 10/2007 | Yamamoto | .............. | B60K 37/06 382/104 |
| 7,552,402 B2 * | 6/2009 | Bilow | .............. | G06F 3/0425 345/173 |
| 7,612,786 B2 * | 11/2009 | Vale | .............. | G06F 3/04883 345/173 |
| 8,239,784 B2 * | 8/2012 | Hotelling | .............. | G06F 3/0418 345/173 |
| 8,286,096 B2 * | 10/2012 | Shibaike | .............. | G06F 3/0482 345/156 |
| 8,345,008 B2 * | 1/2013 | Lee | .............. | G06F 3/04886 345/168 |

(Continued)

FOREIGN PATENT DOCUMENTS

WO WO 20130711198 * 5/2013

*Primary Examiner* — Steven B Theriault
(74) *Attorney, Agent, or Firm* — The Farrell Law Firm, P.C.

(57) ABSTRACT

A method in an electronic device is provided. The method includes detecting a number of input tools on a touch screen, switching into one input mode among at least two set input modes according to the number of the detected input tools, and receiving a set content or changing a layout of a displayed content according to a touch-inputted input tool among the detected input tools, a relative length change, and a movement direction of the touch-inputted input tool.

18 Claims, 10 Drawing Sheets

(56) References Cited

U.S. PATENT DOCUMENTS

| | | | | |
|---|---|---|---|---|
| 8,384,678 B2* | 2/2013 | Jang | G06F 3/0412 | 345/173 |
| 8,390,584 B1* | 3/2013 | Bhojan | G06F 3/04883 | 178/18.01 |
| 8,407,606 B1* | 3/2013 | Davidson | G06F 3/0488 | 345/173 |
| 8,566,044 B2* | 10/2013 | Shaffer | G06F 3/04883 | 345/173 |
| 8,717,317 B2* | 5/2014 | Akiyoshi | G06F 3/04883 | 345/173 |
| 8,754,864 B2* | 6/2014 | Paul | G06F 3/04883 | 345/173 |
| 8,786,559 B2* | 7/2014 | Hogan | G06F 3/04883 | 345/173 |
| 8,819,812 B1* | 8/2014 | Weber | G06F 3/017 | 726/19 |
| 8,930,834 B2* | 1/2015 | Sunday | G06F 3/0488 | 715/249 |
| 8,957,868 B2* | 2/2015 | Zhu | G06F 3/04883 | 345/173 |
| 9,003,322 B2* | 4/2015 | Kwon | G06F 3/0485 | 345/173 |
| 9,063,647 B2* | 6/2015 | Zotov | G06F 3/0416 | |
| 9,104,308 B2* | 8/2015 | Au | G06F 3/04883 | |
| 9,176,591 B2* | 11/2015 | Nair | G06F 3/0213 | |
| 9,298,275 B2* | 3/2016 | Mortel | G06F 3/0233 | |
| 9,430,128 B2* | 8/2016 | Hayes | G06F 3/04883 | |
| 9,436,304 B1* | 9/2016 | Leiba | G06F 3/041 | |
| 9,489,086 B1* | 11/2016 | Marsden | G06F 3/04886 | |
| 9,535,603 B2* | 1/2017 | Andersen | G06F 3/04886 | |
| 9,703,389 B2* | 7/2017 | Jiang | G06F 3/0213 | |
| 9,727,235 B2* | 8/2017 | Cromer | G06F 3/04886 | |
| 9,753,578 B2* | 9/2017 | Wang | G06F 3/0418 | |
| 9,921,659 B2* | 3/2018 | Weber | G06F 3/017 | |
| 2002/0015024 A1* | 2/2002 | Westerman | G06F 3/0235 | 345/173 |
| 2002/0036618 A1* | 3/2002 | Wakai | | 345/173 |
| 2003/0112225 A1* | 6/2003 | Granberg | H04M 1/0202 | 345/173 |
| 2003/0223038 A1* | 12/2003 | Alster | A61B 3/02 | 351/211 |
| 2004/0239646 A1* | 12/2004 | Wang | G06F 3/04886 | 345/173 |
| 2005/0063564 A1* | 3/2005 | Yamamoto | B60R 25/2045 | 382/104 |
| 2005/0122313 A1* | 6/2005 | Ashby | G06F 3/0219 | 345/168 |
| 2005/0225538 A1* | 10/2005 | Verhaegh | G06F 3/04886 | 345/173 |
| 2006/0125803 A1* | 6/2006 | Westerman | G06F 3/04883 | 345/173 |
| 2006/0132447 A1* | 6/2006 | Conrad | G06F 3/0219 | 345/168 |
| 2006/0156249 A1* | 7/2006 | Blythe | G06F 3/0481 | 715/781 |
| 2007/0040812 A1* | 2/2007 | Tang | H04M 1/2535 | 345/173 |
| 2007/0177803 A1* | 8/2007 | Elias | G06F 3/04883 | 382/188 |
| 2007/0220444 A1* | 9/2007 | Sunday | G06F 3/0488 | 715/788 |
| 2007/0252818 A1* | 11/2007 | Zlotnicki | G06F 3/0237 | 345/169 |
| 2007/0256029 A1* | 11/2007 | Maxwell | G06F 3/0482 | 715/834 |
| 2008/0012835 A1* | 1/2008 | Rimon | G06F 3/038 | 345/173 |
| 2008/0036743 A1* | 2/2008 | Westerman | G06F 3/038 | 345/173 |
| 2008/0042979 A1* | 2/2008 | Nikbin | G06F 3/0233 | 345/168 |
| 2008/0129759 A1* | 6/2008 | Jeon | G06F 3/04845 | 345/667 |
| 2008/0165141 A1* | 7/2008 | Christie | G06F 3/044 | 345/173 |
| 2008/0174556 A1* | 7/2008 | Jo | G06F 1/1626 | 345/163 |
| 2009/0046065 A1* | 2/2009 | Liu | G06F 3/0233 | 345/168 |
| 2009/0051659 A1* | 2/2009 | Mickelborough | G06F 3/0235 | 345/173 |
| 2009/0237359 A1 | 9/2009 | Kim et al. | | |
| 2009/0237421 A1* | 9/2009 | Kim | G06F 3/0485 | 345/661 |
| 2009/0278812 A1* | 11/2009 | Yasutake | G06F 3/04815 | 345/173 |
| 2009/0278915 A1* | 11/2009 | Kramer | G06F 3/017 | 348/48 |
| 2009/0295727 A1* | 12/2009 | Tseng | G06F 3/0416 | 345/163 |
| 2010/0031203 A1* | 2/2010 | Morris | G06F 3/04883 | 715/863 |
| 2010/0050133 A1* | 2/2010 | Nishihara | G06F 3/017 | 715/863 |
| 2010/0101872 A1* | 4/2010 | Ikeda | G06F 3/0416 | 178/18.01 |
| 2010/0107067 A1* | 4/2010 | Vaisanen | G06F 3/0486 | 715/702 |
| 2010/0110031 A1* | 5/2010 | Miyazawa | G06F 3/0488 | 345/173 |
| 2010/0123669 A1* | 5/2010 | Chae | G06F 3/0488 | 345/173 |
| 2010/0127995 A1* | 5/2010 | Rigazio | G06F 3/04886 | 345/173 |
| 2010/0141590 A1* | 6/2010 | Markiewicz | G06F 3/0488 | 345/173 |
| 2010/0148995 A1* | 6/2010 | Elias | G06F 3/0488 | 341/22 |
| 2010/0162181 A1* | 6/2010 | Shiplacoff | G06F 3/0485 | 715/863 |
| 2010/0177035 A1* | 7/2010 | Schowengerdt | G06F 1/163 | 345/156 |
| 2010/0253630 A1* | 10/2010 | Homma | G06F 3/0202 | 345/168 |
| 2011/0102333 A1* | 5/2011 | Westerman | G06F 3/04883 | 345/173 |
| 2011/0115719 A1* | 5/2011 | Ng | G06F 1/1613 | 345/173 |
| 2011/0148786 A1* | 6/2011 | Day | G06F 3/04883 | 345/173 |
| 2011/0164029 A1* | 7/2011 | King | G06F 3/04883 | 345/419 |
| 2011/0234491 A1* | 9/2011 | Nurmi | G06F 3/041 | 345/157 |
| 2011/0242137 A1 | 10/2011 | Lee et al. | | |
| 2011/0260962 A1* | 10/2011 | Benko | G06F 3/04883 | 345/156 |
| 2011/0261058 A1* | 10/2011 | Luo | G06F 1/1626 | 345/441 |
| 2011/0285625 A1* | 11/2011 | Nakanishi | G06F 1/1616 | 345/158 |
| 2012/0044243 A1* | 2/2012 | Kim | G06F 3/04883 | 345/419 |
| 2012/0056836 A1* | 3/2012 | Cha | G06F 3/04842 | 345/173 |
| 2012/0075192 A1* | 3/2012 | Marsden | G06F 3/04886 | 345/168 |
| 2012/0133589 A1* | 5/2012 | Marsden | G06F 3/04886 | 345/168 |
| 2012/0144337 A1* | 6/2012 | Archer | G06F 3/04886 | 715/773 |
| 2012/0154313 A1* | 6/2012 | Au | G06F 3/04883 | 345/173 |
| 2012/0162086 A1* | 6/2012 | Rhee | G06F 3/018 | 345/171 |
| 2012/0162105 A1* | 6/2012 | Sakurai | G06F 3/0488 | 345/173 |

(56) References Cited

U.S. PATENT DOCUMENTS

| | | | |
|---|---|---|---|
| 2012/0169621 A1* | 7/2012 | Grossman | G06F 3/04886 345/173 |
| 2012/0188201 A1* | 7/2012 | Binstead | G06F 3/041 345/174 |
| 2012/0206363 A1* | 8/2012 | Kyprianou | G06F 3/04886 345/168 |
| 2012/0212420 A1* | 8/2012 | Shin | G06F 3/04883 345/173 |
| 2012/0242578 A1* | 9/2012 | Laubach | G06F 3/0213 345/160 |
| 2012/0242581 A1* | 9/2012 | Laubach | G06F 3/04812 345/168 |
| 2012/0266079 A1* | 10/2012 | Lee | G06F 17/30902 715/744 |
| 2012/0268389 A1* | 10/2012 | Yaron | G06F 3/0233 345/173 |
| 2012/0299861 A1* | 11/2012 | Takahashi | G06F 3/04883 345/173 |
| 2012/0306759 A1* | 12/2012 | Luo | G06F 3/0233 345/168 |
| 2012/0306769 A1* | 12/2012 | Zhu | G06F 3/04883 345/173 |
| 2013/0019182 A1* | 1/2013 | Gil | G06F 3/0482 715/738 |
| 2013/0021242 A1* | 1/2013 | He | G06F 3/04883 345/157 |
| 2013/0027290 A1* | 1/2013 | Wong | G06F 3/017 345/156 |
| 2013/0063357 A1* | 3/2013 | Lee | G06F 3/0233 345/168 |
| 2013/0113714 A1* | 5/2013 | Mao | G06F 3/0234 345/173 |
| 2013/0127733 A1* | 5/2013 | Krishnaswamy | G06F 3/04883 345/173 |
| 2013/0169540 A1* | 7/2013 | Dinh | G06F 3/04886 345/168 |
| 2013/0215037 A1* | 8/2013 | Mao | G06F 3/04886 345/168 |
| 2013/0222247 A1* | 8/2013 | Liu | G06F 3/04886 345/168 |
| 2013/0234949 A1* | 9/2013 | Chornenky | G06F 3/0216 345/169 |
| 2013/0249837 A1* | 9/2013 | Liu | G06F 3/04883 345/173 |
| 2013/0257732 A1* | 10/2013 | Duffield | G06F 3/0236 345/168 |
| 2013/0257746 A1* | 10/2013 | Cherkasov | G06F 3/0488 345/173 |
| 2013/0265218 A1* | 10/2013 | Moscarillo | G06F 3/017 345/156 |
| 2013/0275907 A1* | 10/2013 | Lau | G06F 3/04886 715/773 |
| 2013/0346914 A1* | 12/2013 | Jeong | G06F 3/0485 715/784 |
| 2014/0002398 A1* | 1/2014 | Bao | G06F 3/0488 345/173 |
| 2014/0028562 A1* | 1/2014 | St. Clair | G06F 3/04886 345/168 |
| 2014/0028567 A1* | 1/2014 | Park | G06F 3/005 345/168 |
| 2014/0104320 A1* | 4/2014 | Davidson | G09G 5/32 345/681 |
| 2014/0189551 A1* | 7/2014 | Kim | G06F 3/04817 715/765 |
| 2014/0191977 A1* | 7/2014 | Feng | G06F 3/018 345/173 |
| 2014/0198049 A1* | 7/2014 | Xue | G06F 3/04815 345/168 |
| 2014/0198063 A1* | 7/2014 | Kajiya | G06F 3/041 345/173 |
| 2014/0208274 A1* | 7/2014 | Smyth | G06F 3/0304 715/863 |
| 2014/0218315 A1* | 8/2014 | Jeong | G06F 3/04883 345/173 |
| 2014/0267044 A1* | 9/2014 | Andersen | G06F 3/04886 345/168 |
| 2014/0298266 A1* | 10/2014 | Lapp | G06F 3/04883 715/835 |
| 2014/0368421 A1* | 12/2014 | Smus | G06F 3/038 345/156 |
| 2015/0084913 A1* | 3/2015 | Okano | G06F 3/044 345/174 |
| 2015/0143276 A1* | 5/2015 | Luo | G06F 1/1626 715/773 |
| 2015/0143277 A1* | 5/2015 | Yoon | G06F 3/0233 715/773 |
| 2015/0186004 A1* | 7/2015 | Gordon | G06F 3/0488 345/173 |
| 2015/0253985 A1* | 9/2015 | Siegman | G06F 3/04886 715/773 |
| 2015/0324009 A1* | 11/2015 | Lee | G06F 3/023 345/168 |
| 2016/0196042 A1* | 7/2016 | Laute | G06F 3/017 715/845 |

* cited by examiner

METHOD FOR CHANGING AN INPUT MODE IN AN ELECTRONIC DEVICE

PRIORITY

This application claims priority under 35 U.S.C. § 119(a) to Korean Patent Application Serial No. 10-2013-0139939, which was filed in the Korean Intellectual Property Office on Nov. 18, 2013, the contents of which are incorporated herein by reference.

BACKGROUND OF THE INVENTION

1. Field of the Invention

The present invention relates to a method for changing an input mode in an electronic device, and more particularly, to a method that allows an electronic device to switch into one or more input modes according to a number of detected input tools.

2. Description of the Related Art

An electronic device may receive various commands and texts from a user with an additional input button. For example, an electronic device may receive texts easily from a user with a keyboard having a similar shape to the user's hand and may be equipped with an additional button for changing an input mode to receive various inputs.

SUMMARY OF THE INVENTION

The present invention has been made to address at least the problems and/or disadvantages described above and to provide at least the advantages described below.

Accordingly, an aspect of the present invention is to provide a device and method for reducing the user's interaction as switching into a set input mode according to the number of detected input tools without an additional operation for switching an input mode.

Another aspect of the present invention is to provide a device and method for improving the user's convenience as receiving a predefined text without displaying a keypad of a corresponding input mode when switching into one set input mode.

Another aspect of the present invention is to provide a device and method for satisfying user's various demands as easily changing a layout of a displayed content by receiving a touch input from one input means after detecting a set number of input tools. In accordance with an aspect of the present invention, a method in an electronic device is provided. The method includes detecting a number of input tools on a touch screen, switching into one input mode among at least two set input modes according to the number of the detected input tools, and receiving a set content or changing a layout of a displayed content according to a touch-inputted input tool among the detected input tools, a relative length change, and a movement direction of the touch-inputted input tool.

In accordance with another aspect of the present invention, an electronic device is provided. The electronic device includes a processor configured to detect a number of input tools on a touch screen, switch into one input mode among at least two set input modes according to the number of the detected input tools, and receive a set content or changing a layout of a displayed content according to a touch-inputted input tool among the detected input tools, a relative length change, and a movement direction of the touch-inputted input tool and a memory configured to store data controlled by the processor.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF EMBODIMENTS OF THE PRESENT INVENTION

Figure 1:
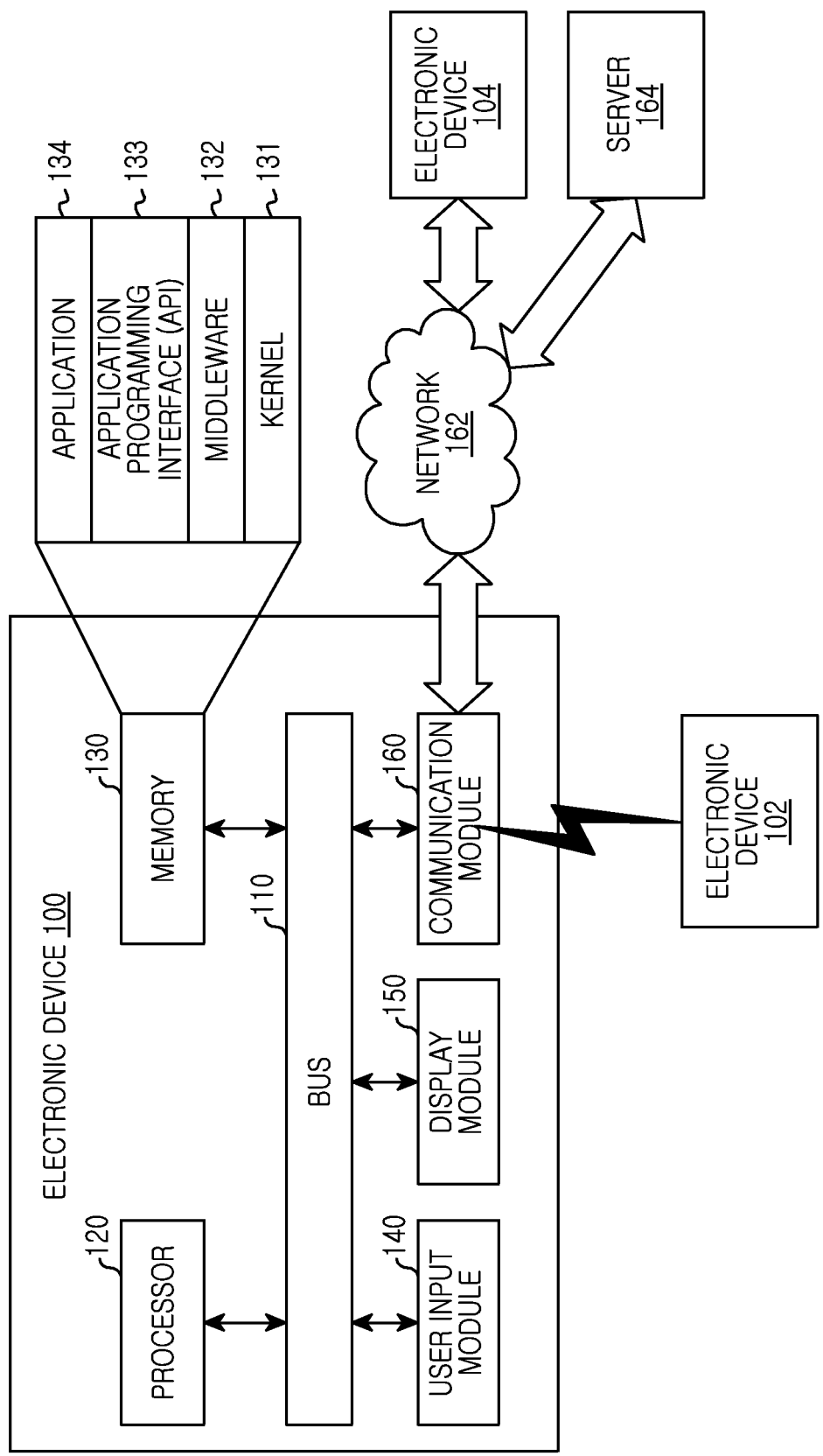
FIG. 1 is a block diagram illustrating an electronic device, according to an embodiment of the present invention.

Hereinafter, embodiments of the present invention will be described in more detail with reference to the accompanying drawings. In relation to the present invention, specific embodiments are illustrated in drawings and related detailed descriptions are listed and also various modifications are possible and thus various embodiments are provided. Accordingly, the present disclosure is not intended to limit specific embodiments and is understood that it should include all modifications, equivalents, and substitutes within the scope and technical range of the present invention. With respect to the descriptions of the drawings, like reference numerals refer to like elements.

An electronic device according to an embodiment of the present invention may be a device having a communication function. For example, the electronic device may be at least one or a combination of a smart phone, a tablet personal computer (PC), a mobile phone, a video phone, an e-book reader, a desktop PC, a laptop PC, a netbook computer, personal digital assistant (PDA), a portable multimedia player (PMP), an MP3 player, a mobile medical device, an electronic bracelet, an electronic necklace, an electronic appcessory, a camera, a wearable device, an electronic clock, a wrist watch, smart white appliance (for example, a refrigerator, an air conditioner, a vacuum cleaner, an artificial intelligence robot, a TV, a digital video disk (DVD) player, an audio system, an oven, a microwave, a washing machine, an air purifier, and a digital photo frame), various medical devices (for example, magnetic resonance angiography (MRA), magnetic resonance imaging (MRI), computed tomography (CT), tomography, and ultrasonograph), a navigation device, a global positioning system (GPS) receiver, an event data recorder (EDR), a flight data recorder (FDR), a set-top box, a TV box (for example, Samsung HomeSync™, Apple TV™, or a Google TV™), an electronic dictionary, a vehicle infotainment device, electronic equipment for ship (for example, a navigation device for ship and a gyro compass), avionics, a security device, an electronic garment, an electronic key, a camcorder, a game console, head-mounted display (HMD), a flat panel display device, an electronic album, part of a furniture or building/structure including a communication function, an electronic board, an electronic signature receiving device, and a projector. It is apparent to those skilled in the art that the electronic device is not limited to the above-mentioned devices.

FIG. 1 is a block diagram illustrating an electronic device, according to an embodiment of the present invention. Referring to FIG. 1, the electronic device 100 includes a bus 110, a processor 120, a memory 130, a user input module 140, a display module 150, and a communication module 160.

The bus 110 may be a circuit for connecting the above-mentioned components to each other and for delivering a communication (for example, a control message) therebetween.

The processor 120 receives an instruction from the above other components (for example, the memory 130, the user input module 140, the display module 150, and the communication module 160) through the bus 110, interprets the received instruction, and performs operations and data processing in response to the interpreted instruction.

The memory 130 stores an instruction or data received from the processor 120 or other components (for example, the user input module 140, the display module 150, and the communication module 160) or an instruction or data generated from the processor 120 or other components. The memory 130 includes programming modules, for example, a kernel 131, a middleware 132, an application programming interface (API) 133, and an application 134. Each of the above-mentioned programming modules may be configured with software, firmware, hardware, or a combination thereof.

The kernel 131 controls or manages system resources (for example, the bus 110, the processor 120, or the memory 130) used for performing operations or functions implemented by the remaining other programming modules, for example, the middleware 132, the API 133, or the application 134. Additionally, the kernel 131 provides an interface for accessing, controlling and/or managing an individual component of the electronic device 100 from the middleware 132, the API 133, or the application 134.

The middleware 132 serves as an intermediary role for exchanging data between the API 133 or the application 134 and the kernel 131. Additionally, in relation to job requests received from a plurality of applications 134, the middleware 132 performs a load balancing on the job requests by using a method of assigning a priority for using a system resource (for example, the bus 110, the processor 120, or the memory 130) to at least one application among the plurality of applications 134.

The API 133, as an interface through which the application 134 controls a function provided from the kernel 131 or the middleware 132, may include at least one interface or function for file control, window control, image processing, or character control.

The user input module 140 receives an instruction or data from a user and deliver it to the processor 120 or the memory 130 through the bus 110. The display module 150 displays an image, video, or data to a user.

The communication module 160 connects a communication between another electronic device 102 and the electronic device 100. The communication module 160 supports a predetermined short range communication protocol (for example, wireless fidelity (Wi-Fi), Bluetooth® (BT), near field communication (NFC)) or a predetermined network communication 162 (for example, Internet, local area network (LAN), wide area network (WAN), telecommunication network, cellular network, satellite network or plain old telephone service (POTS)). The electronic device 102 and an electronic device 104 (FIG. 1) may be identical to (for example, the same type) or different from (for example, a different type) the electronic device 100.

Figure 2:
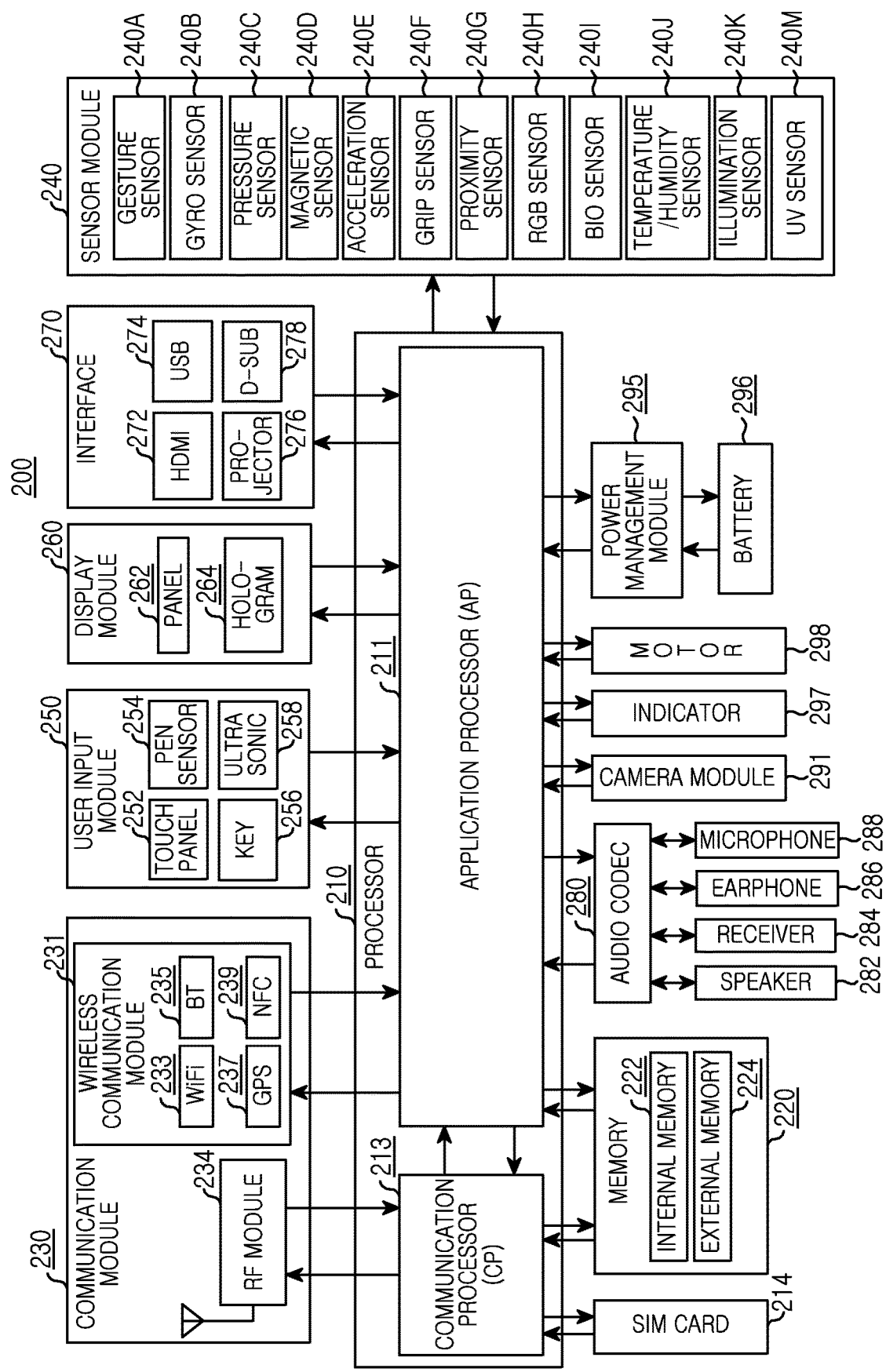
FIG. 2 is a block diagram of hardware, according to an embodiment of the present invention.

FIG. 2 is a block diagram of hardware according to an embodiment of the present invention. The hardware 200 may be incorporated into the electronic device 100 shown in FIG. 1, for example. Referring to FIG. 2, the hardware 200 includes at least one processor 210, a subscriber identification module (SIM) card 214, a memory 220, a communication module 230, a sensor module 240, a user input module 250, a display module 260, an interface 270, an audio codec 280, a camera module 291, a power management module 295, a battery 296, an indicator 297, and a motor 298.

The processor 210 (for example, the processor 120) includes at least one application processor (AP) 211 and/or at least one communication processor (CP) 213. The processor 210 may be the processor 120 shown in FIG. 1, for example. Although the AP 211 and the CP 213 included in the processor 210 are shown in FIG. 2, they may be included in different IC packages. According to an embodiment of the present invention, the AP 211 and the CP 213 may be included in one IC package. The processor 210 detects the number of input tools positioned on a touch screen, switches into one input mode among at least two set input modes according to the number of the detected input tools, receives a content set, and/or changes a layout of a displayed content according to a touch-inputted input tool among the detected input tools and a relative length change of the touch-inputted input tool. Additionally, the processor 210 detects the number of input tools when an input tool is positioned on a touch screen at less than a set height or for more than a set time. Additionally, when a movement of a detected input tool is confirmed, the processor 210 confirms that a key pad displayed in an area where hovering is detected by an input tool moves together each time the input tool moves. Additionally, the processor 210 sets a virtual reference line connecting a set area of each input tool detected according to a switched input mode. Additionally, when a movement of a detected input tool is confirmed, the processor 210 confirms that the set virtual reference line moves together each time the input tool moves. Additionally, the processor 210 compares a relative length change of a touch-inputted input tool and the remaining input tool other than the touch-inputted input tool. Additionally, the processor 210 confirms at least two contents set to be received from a touch-inputted input tool and also confirms that the length of the touch-inputted input tool is detected relatively longer than the length of the remaining input tool. Additionally, the processor 210 confirms at least two contents set to be received from a touch-inputted input tool and also confirms that the length of the touch-inputted input tool is detected identical to the length of the remaining input tool. Additionally, the processor 210 confirms at least two contents set to be received from a touch-inputted input tool and also confirms that the length of the touch-inputted input tool is detected relatively shorter than the length of the remaining input tool. Additionally, the processor 210 confirms that a touch input is dragged in a set direction while receiving the touch input from an input tool and confirms that a layout of a displayed content is changed as the input tool is dragged in a set direction. Moreover, the processor 210 confirms that at least one of the font, font size, thickness, color, transparency and display type of a displayed content is changed.

The AP 211 controls a plurality of hardware or software components connected to the AP 211 by executing an operating system or an application program and performs various data processing and operations with multimedia data. The AP 211 may be implemented with a system on chip (SoC), for example. According to an embodiment of the present invention, the processor 210 may further include a graphic processing unit (GPU).

The CP 213 manages a data link in a communication between an electronic device (for example, the electronic device 100) including the hardware 200 and other electronic devices connected via a network and converts a communication protocol. The CP 213 may be implemented with a SoC, for example. According to an embodiment of the present invention, the CP 213 performs at least part of a multimedia control function. The CP 213 performs a distinction and authentication of a terminal in a communication network by using a subscriber identification module (for example, the SIM card 214), for example. Additionally, the CP 213 provides services, for example, a voice call, a video call, a text message, or packet data, to a user.

Additionally, the CP 213 controls the data transmission of the communication module 230. As shown in FIG. 2, components such as the CP 213, the power management module 295, or the memory 220 are separated from the AP 211, but according to an embodiment of the present invention, the AP 211 may be implemented including some of the above-mentioned components (for example, the CP 213).

According to an embodiment of the present invention, the AP 211 or the CP 213 loads commands or data, which are received from a nonvolatile memory or at least one of other components connected thereto, into a volatile memory and processes them. Furthermore, the AP 211 or the CP 213 stores data received from or generated by at least one of other components in a nonvolatile memory.

The SIM card 214 may be a card implementing a subscriber identification module and may be inserted into a slot formed at a specific position of an electronic device. The SIM card 214 may include unique identification information (for example, an integrated circuit card identifier (ICCID)) or subscriber information (for example, an international mobile subscriber identity (IMSI)).

The memory 220 includes an internal memory 222 and/or an external memory 224. The memory 220 may be the memory 130 shown in FIG. 1, for example. The internal memory 222 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, NAND flash memory, and NOR flash memory) According to an embodiment of the present invention, the internal memory 222 may have a form of Solid State Drive (SSD). The external memory 224 may further include compact flash (CF), secure digital (SD), micro secure digital (Micro-SD), mini secure digital (Mini-SD), extreme digital (xD), or memorystick.

The communication module 230 includes a wireless communication module 231 and/or an RF module 234. The communication module 230 may be the communication unit 160 shown in FIG. 1, for example. The wireless communication module 231 includes a Wi-Fi 233, BT 235, a GPS 237, or a NFC 239. For example, the wireless communication module 231 provides a wireless communication function by using a wireless frequency. Additionally or alternatively, the wireless communication module 231 may include a network interface (for example, a LAN card) or a modem for connecting the hardware 200 to a network (for example, Internet, LAN, WAN, telecommunication network, cellular network, satellite network, or POTS).

The RF module 234 may be responsible for data transmission, for example, the transmission of an RF signal or a called electrical signal. Although not shown in the drawings, the RF module 234 may include a transceiver, a power amp module (PAM), a frequency filter, or a low noise amplifier (LNA). The RF module 234 may further include components for transmitting/receiving electromagnetic waves on free space in a wireless communication, for example, conductors or conducting wires.

The sensor module 240 includes at least one of a gesture sensor 240A, a gyro sensor 240B, a pressure sensor 240C, a magnetic sensor 240D, an acceleration sensor 240E, a grip sensor 240F, a proximity sensor 240G, a red, green, blue (RGB) sensor 240H, a bio sensor 240I, a temperature/humidity sensor 240J, an illumination sensor 240K, and a ultra violet (UV) sensor 240M. The sensor module 240 measures physical quantities and/or detects an operating state of an electronic device, thereby converting the measured or detected information into electrical signals. Additionally/alternately, the sensor module 240 may include an E-nose sensor (not shown), an electromyography (EMG) sensor, an electroencephalogram (EEG) sensor (not shown), or an electrocardiogram (ECG) sensor (not shown). The sensor module 240 may further include a control circuit for controlling at least one sensor therein.

The user input unit 250 includes a touch panel 252, a (digital) pen sensor 254, a key 256, and/or an ultrasonic input device 258. The user input unit 250 may be the user input unit 140 shown in FIG. 1, for example. The touch panel 252 recognizes a touch input through at least one of a capacitive, resistive, infrared, or ultrasonic method, for example. Additionally, the touch panel 252 may further include a controller. In the case of the capacitive method, both direct touch and proximity recognition are possible. The touch panel 252 may further include a tactile layer. In this case, the touch panel 252 may provide a tactile response to a user.

The (digital) pen sensor 254 may be implemented through a method similar or identical to that of receiving a user's touch input or an additional sheet for recognition. As for the key 256, a keypad or a touch key may be used, for example. The ultrasonic input device 258, as a device confirming data by detecting sound waves through a microphone 288) in a terminal, may provide wireless recognition through a pen generating ultrasonic signals. According to an embodiment of the present invention, the hardware 200 receives a user input from an external device (for example, a network, a computer, or a server) connected to the hardware 200 through the communication module 230.

The display module 260 includes a panel 262 and/or a hologram 264. The display module 260 may be the display module 150 shown in FIG. 1, for example. The panel 262 may include a liquid-crystal display (LCD) or an active-matrix organic light-emitting diode (AM-OLED). The panel 262 may be implemented to be flexible, transparent, or wearable, for example. The panel 262 and the touch panel 252 may be configured with one module. The hologram 264 may show three-dimensional images in the air by using the interference of light. According to an embodiment of the present invention, the display module 260 may further include a control circuit for controlling the panel 262 or the hologram 264. The display module 260 displays a set keypad in an area where hovering is detected by an input tool according to a switched input mode. Additionally, the display module 260 receives a touch input from one input tool among detected input tools and receives content from among at least two contents set to be received from the touch-inputted input tool according to a relative length change of the touch-inputted input tool and the remaining input tools. Additionally, when a detected length of the input tool is relatively longer than the length of the remaining input tool, the display module 260 receives content set to be received among at least two set contents. Additionally, when a detected length of the input tool is identical to the length of the remaining input tool, the display module 260 receives one content set to be received among at least two set contents. Additionally, when a detected length of the input tool is relatively shorter than the length of the remaining input tool, the display module 260 receives one content set to be received among at least two set contents. Moreover, the display module 260 receives a touch input from at least one input tool among detected input tools.

The interface 270 includes a high-definition multimedia interface (HDMI) 272, a universal serial bus (USB) 274, a projector 276, or a D-subminiature (sub) 278. Additionally or alternately, the interface 270 may include a secure Digital (SD)/multi-media card (MMC) or an infrared data association (IrDA).

The audio codec 280 converts voice and electrical signals in both directions. The audio codec 280 converts voice information inputted or outputted through a speaker 282, a receiver 284, an earphone 286, or a microphone 288.

The camera unit 291, as a device for capturing an image and video, may include at least one image sensor (for example, a front lens or a rear lens), an image signal processor (ISP), or a flash LED.

The power management module 295 manages the power of the hardware 200. Although not shown in the drawings, the power management module 295 may include a power management integrated circuit (PMIC), a charger integrated circuit (IC), or a battery fuel gauge.

The PMIC may be built in an IC or SoC semiconductor, for example. A charging method may be classified as a wired method and a wireless method. The charger IC charges a battery and prevents overvoltage or overcurrent flow from a charger. According to an embodiment of the present invention, the charger IC may include a charger IC for at least one of a wired charging method and a wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added.

A battery gauge may measure the remaining amount of the battery 296, or a voltage, current, or temperature thereof during charging. The battery 296 generates electricity and supplies power. For example, the battery 296 may be a rechargeable battery.

The indicator 297 displays a specific state of the hardware 200 or part thereof (for example, the AP 211), for example, a booting state, a message state, or a charging state. The motor 298 converts electrical signals into mechanical vibration. The MCU (Main Control Unit) may control the sensor module 240.

Although not shown in the drawings, the hardware 200 may include a processing device (for example, a GPU) for mobile TV support. A processing device for mobile TV support may process media data according to the standards such as digital multimedia broadcasting (DMB), digital video broadcasting (DVB), or media flow.

The names of the above-mentioned components in hardware according to an embodiment of the present invention may vary according to types of an electronic device. Hardware according to an embodiment of the present invention may be configured including at least one of the above-mentioned components or additional other components. Additionally, some of components in hardware according to an embodiment of the present invention are configured as one entity, so that functions of previous corresponding components are performed identically.

Figure 3:
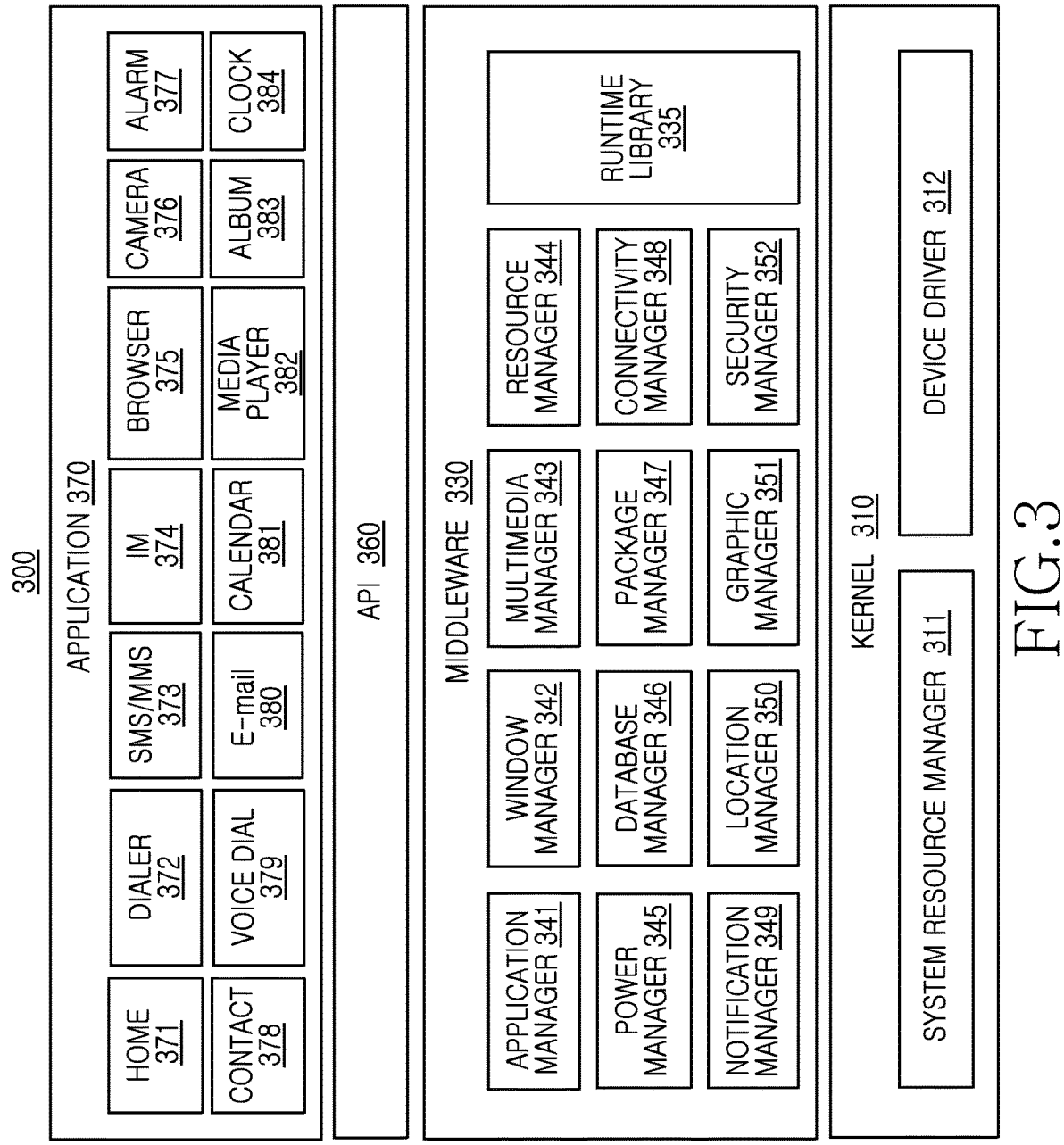
FIG. 3 is a block diagram of a programming module, according to an embodiment of the present invention.

FIG. 3 is a block diagram of a programming module, according to an embodiment of the present invention. The programming unit 300 may be included (for example, stored) in the electronic device 100 (for example, the memory 130) of FIG. 1. At least part of the programming module 300 may be configured with software, firmware, hardware, or a combination thereof. The programming module 300 may include an operating system (OS) controlling a resource relating to an electronic device (for example, the electronic device 100) implemented in hardware (for example, the hardware 200) or various applications (for example, the application 370) running on the OS. For example, the OS may include Android®, iOS, Windows®, Symbian®, Tizen®, or Bada®. Referring to FIG. 3, the programming module 300 includes a kernel 310, a middleware 330, an application programming interface (API) 360, and/or an application 370.

The kernel 310 (for example, the kernel 131) includes a system resource manager 311 and/or a device driver 312. The system resource manager 311 may include a process management unit (not shown), a memory management unit, or a file system management unit, for example. The system resource manager 311 performs control, allocation, and/or recovery of a system resource. The device driver 312 may include a display driver, a camera driver, a BT driver, a sharing memory driver, a USB driver, a keypad driver, a keypad driver, a Wi-Fi driver, or an audio driver. Additionally, according to an embodiment of the present invention, the device driver 312 may include an inter-processing communication (IPC) driver.

The middleware 330 includes a plurality of pre-implemented modules for providing functions that the application 370 commonly requires. Additionally, the middleware 330 provides functions through the API 360 to allow the application 370 to efficiently use a limited system resource in an electronic device. For example, as shown in FIG. 3, the middleware 330 (for example, the middleware 132) includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

The runtime library 335 may include a library module in which a compiler is used to add a new function through programming language while the application 370 is executed. According to an embodiment of the present invention, the runtime library 335 performs functions relating to an input/output, memory management, or calculation operation.

The application manager 341 manages a life cycle of at least one application among the applications 370. The window manager 342 manages a GUI resource using a screen. The multimedia manager 343 y recognizes a format necessary for playing various media files and may perform encoding or decoding on a media file by using codec appropriate for a corresponding format. The resource manager 344 manages a resource such as source code, memory, or storage space of at least one application among the applications 370.

The power manager 345 manages a battery or power in operation with basic input/output system (BIOS) and provides power information necessary for an operation. The database manager 346 performs a management operation to generate, search or change a database used for at least one application among the applications 370. The package manager 347 manages the installation or update of an application distributed in a package file format.

The connectivity manager 348 manages a wireless connection such as Wi-Fi or BT. The notification manager 349 displays or notifies events such as arrival messages, appointments, and proximity alerts in a manner that is not disruptive to a user. The location manager 350 manages location information of an electronic device. The graphic manager 351 manages an effect to be provided to a user or a user interface relating thereto. The security manager 352 provides a general security function necessary for system security or user authentication. According to an embodiment of the present invention, when an electronic device (for example, the electronic device 100) has a call function, the middleware 330 may further include a telephony manager (not shown) for managing a voice or video call function of the electronic device.

The middleware 330 generates and uses a new middleware module through various function combinations of the above-mentioned internal component modules. The middleware 330 provides modules specified according to types of an OS so as to provide distinctive functions. Additionally, the middleware 330 may delete some existing components or add new components dynamically. Accordingly, some components listed in an embodiment of the present invention may be omitted, other components may be added, or components having different names but performing similar functions may be substituted.

The API 360 (for example, the API 133) may be provided as a set of API programming functions with a different configuration according OS. For example, in the case of Android or iOS, for example, one API set may be provided by each platform, and in the case of Tizen, for example, more than two API sets may be provided.

The application 370 (for example, the application 134), for example, may include a preloaded application or a third part application.

At least part of the programming module 300 may be implemented using a command stored in computer-readable storage media. When an instruction is executed by at least one processor (for example, the processor 210), the at least one processor performs a function corresponding to the instruction. The computer-readable storage media may include the memory 220, for example. At least part of the programming module 300 may be implemented or executed by the processor 210, for example. At least part of the programming module 300 may include a module, a program, a routine, sets of instructions, or a process to perform at least one function, for example.

The names of components of a programming module (for example, the programming unit 300) according to an embodiment of the present invention may vary according to types of OS. Additionally, a programming module may include at least one of the above-mentioned components or additional other components. Or, part of the programming module may be omitted.

FIGS. 4A-4D are views illustrating when a set text is inputted according to the number of input tools detected by the electronic device 100, according to a first embodiment of the present invention. First, the electronic device 100 detects the number of input tools positioned on a touch screen, e.g., touch panel 252, of the electronic device 100. In more detail, the electronic device 100 detects that an input tool, e.g., a user's finger, is positioned on the touch screen when the input tool is positioned on the touch screen at less than a set height or for more than a set time.

Then, the electronic device 100 switches into one input mode among a plurality of set input modes according to the number of detected input tools. For example, when the number of input tools is three, the electronic device 100 is set to switch into an input mode for inputting a numeric key. When the number of input tools is five, the electronic device 100 is set to switch into an input mode for inputting an English or Korean language key pad. These cases are described below.

In the above embodiment, when it is determined that the user's three fingers are positioned on the touch screen at less than a set height and for a set time in the electronic device, the electronic device 100 displays a key pad for inputting a numeric key. Here, the electronic device 100 displays a set key pad in an area where hovering is detected by an input tool. For example, as shown in FIG. 4A, the electronic device 100 displays a numeric key pad that switches into an input mode set in an area where hovering is detected by the user's finger.

Additionally, when a movement of a detected input tool is confirmed, the electronic device 100 confirms that a key pad displayed in an area where hovering is detected by an input tool moves together each time the input tool moves. For example, as shown in FIGS. 4A and 4B, as the user's finger moves a key pad displayed at the right part of the touch screen to the left, the electronic device 100 confirms that the key pad moves together to the left part of the touch screen. That is, as an input tool moves, the electronic device 100 moves a key pad together displayed in an area where hovering is detected by the input tool. In the same manner, when an input tool moves in an arbitrary direction since a set key pad moves together in the movement direction of the input tool, user's convenience may be improved from a user's perspective.

Then, the electronic device 100 receives at least one input tool among a plurality of detected input tools and receives content from among at least two contents set to be received from the touch-inputted input tool according to a relative length change and a movement direction of the touch-inputted input tool and the remaining input tools.

Figure 4A:
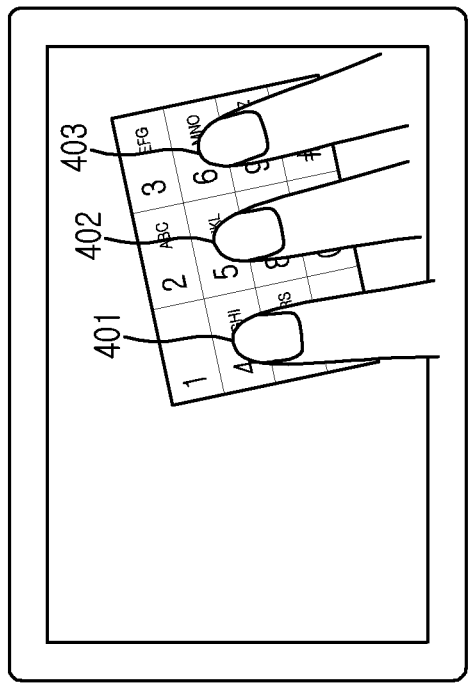
FIGS. 4A-4D are views illustrating when a set text is received according to the number of input tools detected by an electronic device, according to a first embodiment of the present invention.
Figure 4B:
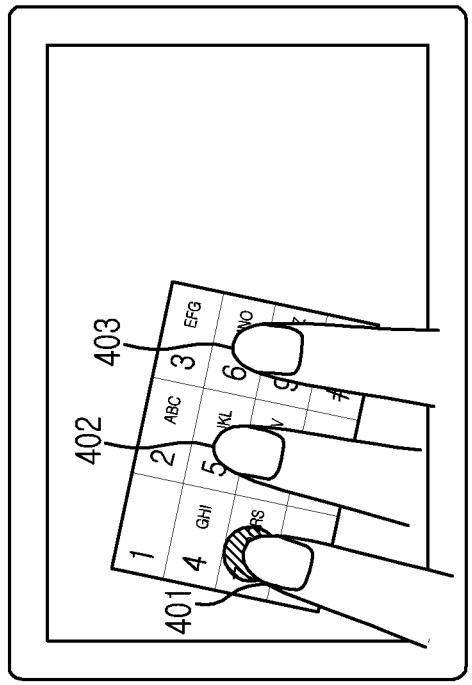

For example, as shown in FIGS. 4A and 4B, the electronic device 100 y receives the text 1, 4, and 7 from a first input tool 401, may receive the text 2, 5, 8, and 0 from a second input tool 402, and may receive the text 3, 6, and 9 from a third input tool 403. These cases are described below.

In the above-mentioned embodiment, while the initial three input tools 401, 402, and 403 are positioned at the same length, when the first input tool 401 moves downward by a set length and a touch input of a moved down area is detected simultaneously, the electronic device 100 receives the number 7, that is, a set text.

Similarly, while the initial three input tools 401, 402, and 403 are positioned at the same length, when the first input tool 401 moves upward by a set length and a touch input of a moved up area is detected simultaneously, the electronic device 100 receives the number 1, that is, a set text. As a result, the electronic device 100 y confirms that a text set for each of the input tools 401, 402, and 403 is receivable and may receive at least one text according to a relative length change of each of the input tools 401, 402, and 403 simultaneously.

Figure 4C:
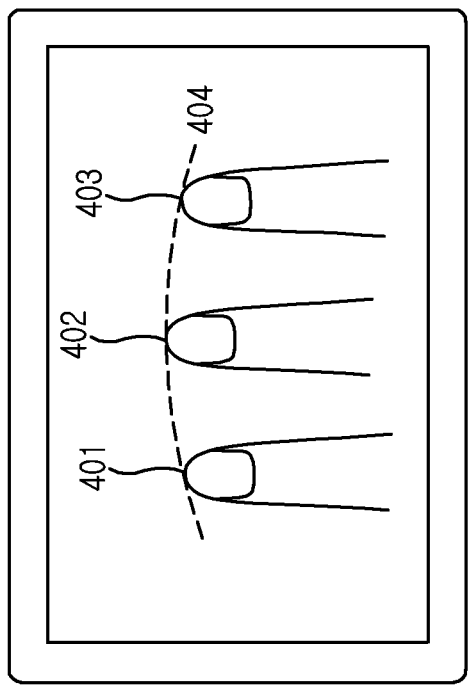

Additionally, the electronic device 100 sets a virtual reference line connecting a set area of each input tool detected according to a switched input mode. For example, as shown in FIG. 4C, the electronic device 100 sets a virtual reference line 404 connecting the outer part of each of the input tools 401, 402, and 403 detected according to a switched input mode. Herein, the electronic device 100 displays the virtual reference line 404 without displaying a set key pad according to the number of detected input tools. That is, as switching into a set input mode, the electronic device 100 displays a key pad set to receive a set text and may display the virtual reference line 404 without displaying the set key pad.

Then, when a movement of a detected input tool is confirmed, the electronic device 100 may confirm that the set virtual reference line moves together each time the input tool moves. That is, as an input tool moves, the electronic device 100 moves a virtual reference line together in an area where hovering is detected by the input tool. Similarly, when an input tool moves in an arbitrary direction since a virtual reference line moves together in the movement direction of the input tool, user's convenience may be improved from a user's perspective.

Then, the electronic device 100 receives at least one input tool among a plurality of detected input tools and receives content from among at least two contents set to be received from the touch-inputted input tool according to a relative length change and a movement direction of the touch-inputted input tool and the remaining input tools.

Figure 4D:
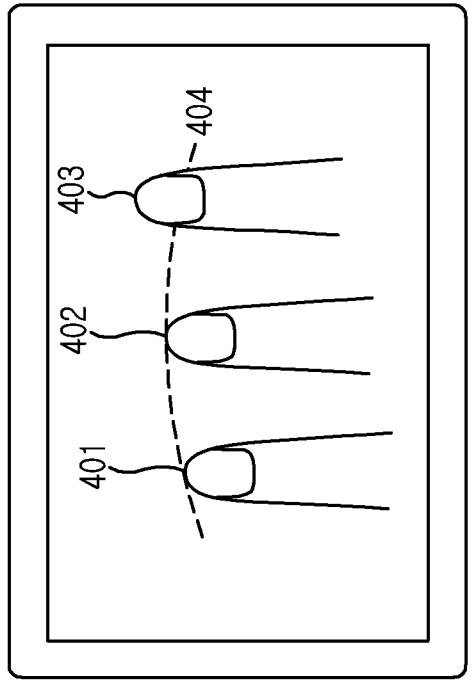

For example, as shown in FIGS. 4C and 4D, the electronic device 100 receives the text 1, 4, and 7 from a first input tool 401, may receive the text 2, 5, 8, and 0 from a second input tool 402, and may receive the text 3, 6, and 9 from a third input tool 403, as are described below.

In the above-mentioned embodiment, while the initial three input tools 401, 402, and 403 are positioned at the same length, when the third input tool 403 moves upward by a set length on the basis of a virtual reference line and a touch input of a moved up area is detected simultaneously, the electronic device 100 receives the number 3, that is, a set text.

Similarly, while the initial three input tools 401, 402, and 403 are positioned at the same length, when the first input tool 401 moves downward by a set length on the basis of the virtual reference line and a touch input of a moved up area is detected simultaneously, the electronic device 100 receives the number 7, that is, a set text. As a result, the electronic device 100 confirms that a text set for each of the input tools 401, 402, and 403 is receivable and may receive at least one text according to a relative length change and a movement direction of each of the input tools 401, 402, and 403 simultaneously.

FIGS. 5A-5D are views illustrating when an electronic device adjusts a layout of a displayed content, according to a first embodiment of the present invention. First, the electronic device 100 detects the number of input tools positioned on a touch screen, e.g., the touch panel 252, of the electronic device 100. In more detail, the electronic device 100 detects that an input tool is positioned on the touch screen when the input tool is positioned on the touch screen at less than a set height or for more than a set time.

Then, the electronic device 100 switches into one input mode among a plurality of set input modes according to the number of detected input tools. For example, when the number of input tools is three, the electronic device 100 is set to switch into an input mode for inputting a numeric key. When the number of input tools is four, the electronic device 100 is set to switch into an input mode for adjusting a layout of a screen, as described below. Additionally, the text "ABCDE" is displayed on the touch screen of the electronic device 100 and the electronic device 100 detects that four input tools are positioned on the touch screen, as will be described below. Additionally, among the four input tools, a first input tool is to adjust the font size of content, a second input tool is to adjust the thickness of content, a third input tool is to adjust the color of content, and a fourth input tool is to adjust the transparency of content, as will be described below.

Figure 5A:
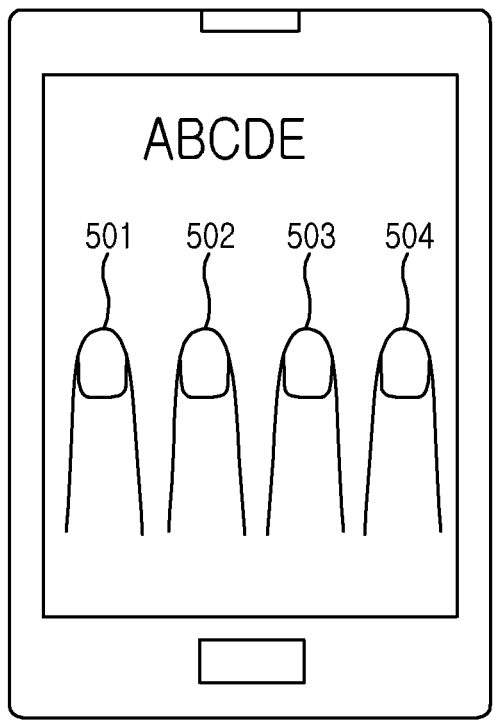
FIGS. 5A-5D are views illustrating when an electronic device adjusts a layout of a displayed content, according to the first embodiment of the present invention.
Figure 5B:
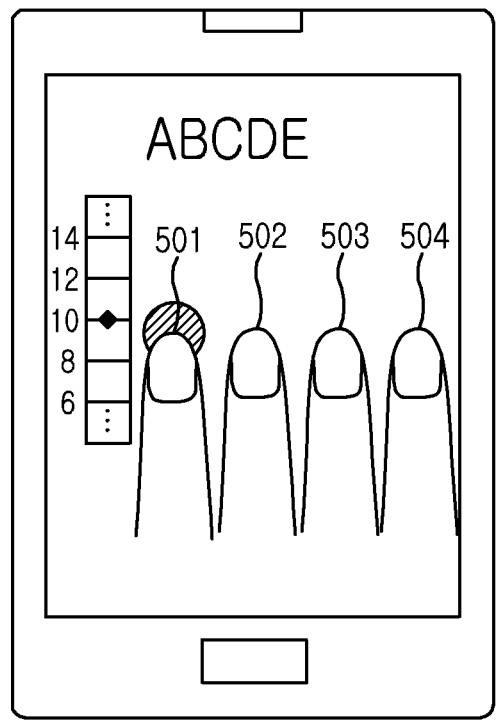

In the above-mentioned embodiment, as shown in FIGS. 5A and 5B, after detecting that the four input tools 501, 502, 503, and 504 are positioned on the touch screen, the electronic device 100 receives a touch input from the first input tool 501 among the four input tools 501, 502, 503, and 504. Then, the electronic device 100 confirms that the first input tool 501 is an input tool for adjusting the font size of the displayed content "ABCDE" and may then display a guide interface representing the font size of the content that is currently displayed at a set position of the touch screen.

Figure 5C:
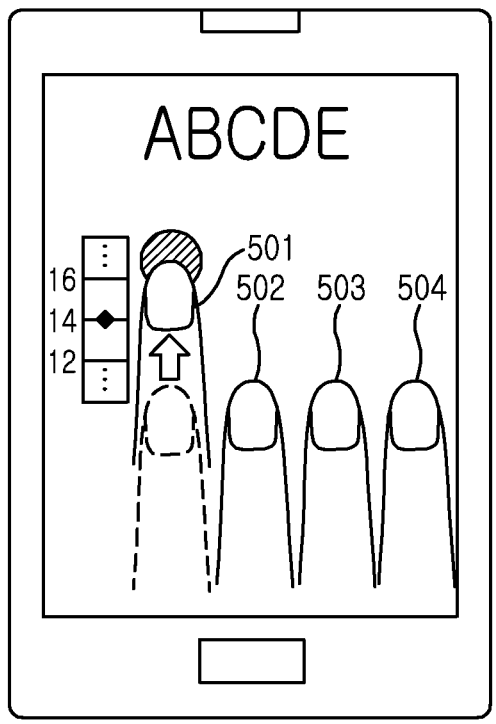
Figure 5D:
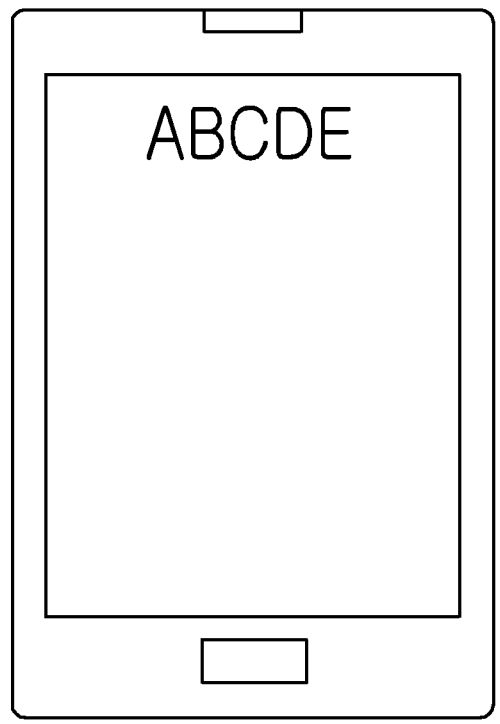

Then, as shown in FIGS. 5C and 5D, the electronic device 100 confirms that the touch-inputted first input tool 501 is dragged in an upper direction while receiving a touch input. At the same time, the electronic device 100 confirms that the font size of the displayed content changes from 10 to 14.

Similarly, although not shown in FIGS. 5A-5D, when it is confirmed that while a touch input is received from the first input tool 501, it is dragged downward, the electronic device 100 displays the font size of the displayed content to be smaller.

Additionally, the electronic device 100 confirms that while a touch input is received from the third input tool 503, it is dragged up or down, and may then confirm that the color of the displayed content is changed.

Additionally, the electronic device 100 confirms that while a touch input is received from the fourth input tool 504, it is dragged up or down, and may then confirm that the transparency of the displayed content is changed.

Additionally, although not shown in FIG. 5, the electronic device 100 adjusts at least two layouts of the displayed content through at least two of the input tools 501, 502, 503, and 504. For example, the electronic device 100 detects that while a touch input is received at the same time from the first input tool 501 and the second input tool 502, it is dragged in a up or down direction and may then adjust the font size and thickness of the displayed content.

Similarly, the electronic device 100 detects that while a touch input is received at the same time from the first input tool 501, the second input tool 502 and the third input tool 503, it is dragged in a set direction and may then adjust the font size, thickness, and color of the displayed content.

As the same meaning, the electronic device 100 detects that while a touch input is received at the same time from the first input tool 501, the second input tool 502, the third input tool 503, and the fourth input tool 504, it is dragged in a set direction and then adjusts the font size, thickness, color, and transparency of the displayed content.

FIG. 6A-6D are views illustrating when an electronic device adjusts a layout of a displayed content according to a second embodiment of the present invention. First, the electronic device 100 detects the number of input tools positioned on a touch screen, e.g., the touch panel 252, of the electronic device 100. In more detail, the electronic device 100 detects that an input tool is positioned on the touch screen when the input tool is positioned on the touch screen at less than a set height or for more than a set time.

Then, the electronic device 100 switches into one input mode among a plurality of set input modes according to the number of detected input tools. For example, when the number of input tools is three, the electronic device 100 is set to switch into an input mode for inputting a numeric key. When the number of input tools is four, the electronic device 100 is set to switch into an input mode for adjusting a layout of a screen. These cases are described below. Additionally, the text "ABCDE" is displayed on the touch screen of the electronic device 100 and the electronic device 100 detects that four input tools are positioned on the touch screen, as will be described below. Additionally, among the four input tools, a first input tool is to adjust the font size of content, a second input tool is to adjust the thickness of content, a third input tool is to adjust the color of content, and a fourth input tool is to adjust the transparency of content, as will be described below.

Figure 6A:
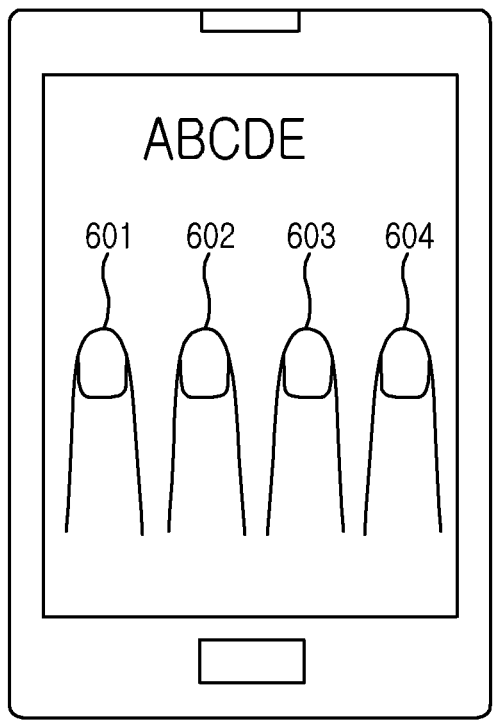
FIGS. 6A-6D are views illustrating when an electronic device adjusts a layout of a displayed content, according to a second embodiment of the present invention.
Figure 6B:
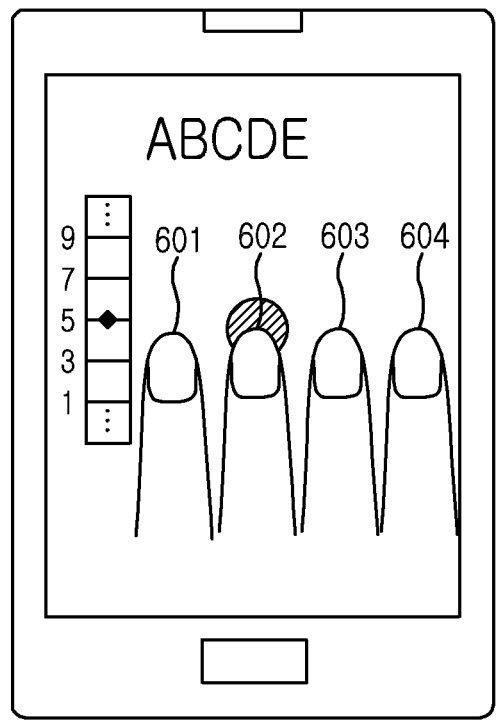

In the above-mentioned embodiment, as shown in FIGS. 6A and 6B, after detecting that the four input tools 601, 602, 603, and 604 are positioned on the touch screen, the electronic device 100 receives a touch input from the second input tool 602 among the four input tools 601, 602, 603, and 604. Then, the electronic device 100 may confirm that the second input tool 602 is an input tool for adjusting the thickness of the displayed content "ABCDE" and then displays a guide interface representing the thickness of the content that is currently displayed at a set position of the touch screen.

Figure 6C:
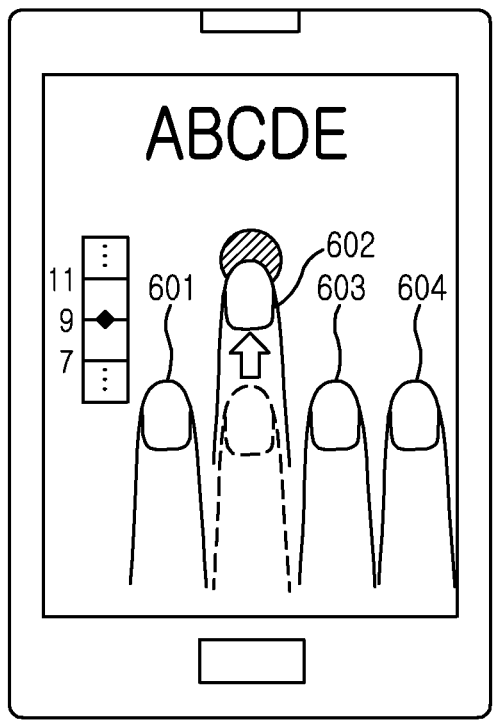
Figure 6D:
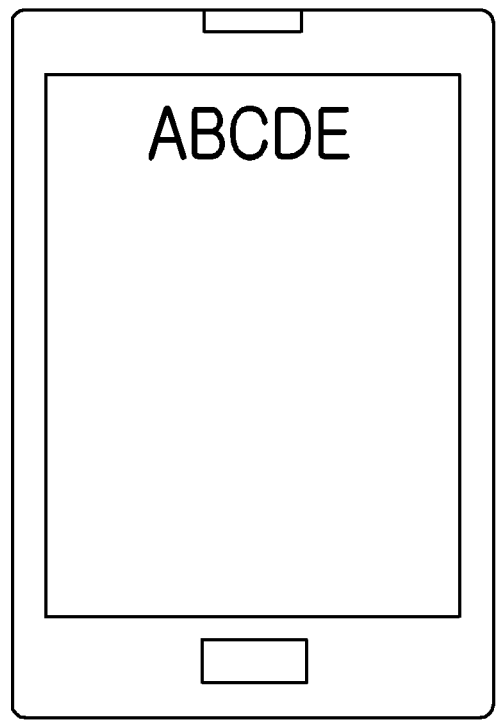

Then, as shown in FIGS. 6C and 6D, the electronic device 100 confirms that the touch-inputted second input tool 602 is dragged in an upper direction while receiving a touch input. At the same time, the electronic device 100 may confirm that the thickness of the displayed content changes from 5 to 9.

FIGS. 7A-7D are views illustrating when a set text is inputted according to the number of input tools detected by the electronic device 100 according to a second embodiment of the present invention. First, the electronic device 100 may detect the number of input tools positioned on a touch screen, e.g., the touch panel 252, of the electronic device 100. In more detail, the electronic device may detect that an input tool is positioned on the touch screen when the input tool is positioned on the touch screen at less than a set height or for more than a set time.

Then, the electronic device 100 switches into one input mode among a plurality of set input modes according to the number of detected input tools. For example, when the number of input tools is three, the electronic device 100 is set to switch into an input mode for inputting a numeric key.

When the number of input tools is eight, the electronic device 100 is set to switch into an input mode for inputting an English language key pad, as described below.

Figure 7A:
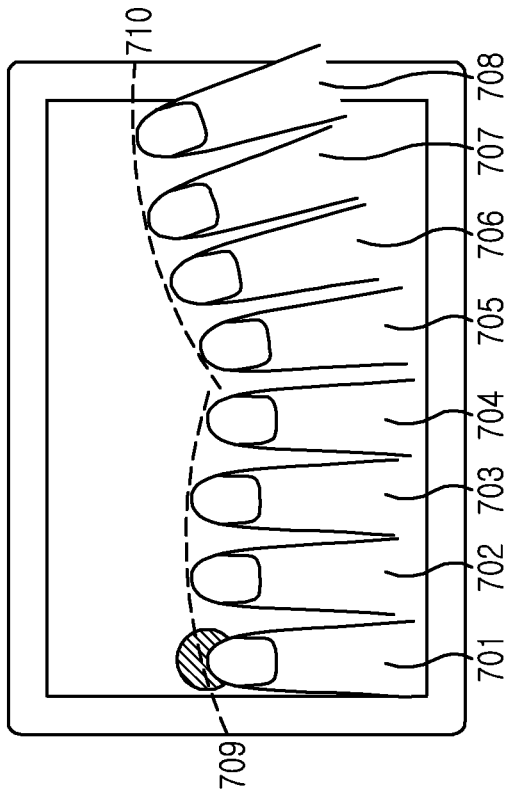
FIGS. 7A-7D are views illustrating when a set text is inputted according to the number of input tools detected by an electronic device, according to the second embodiment of the present invention.
Figure 7B:
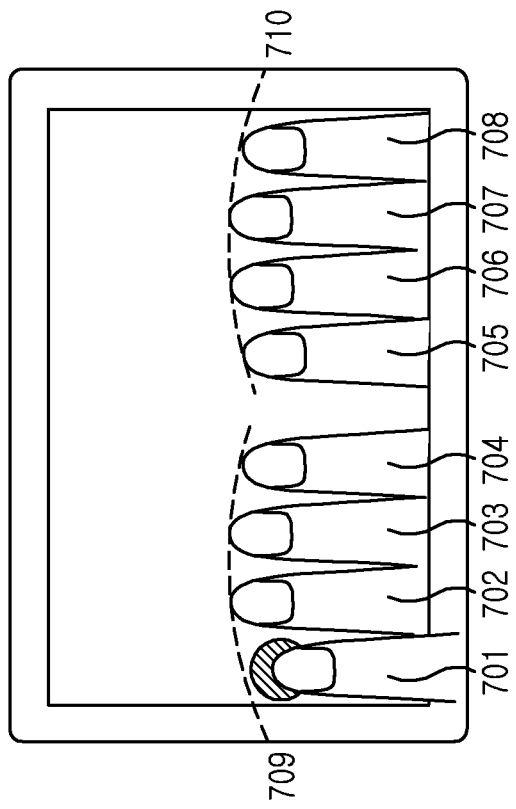

In the above embodiment, when it is determined that the user's eight fingers are positioned on the touch screen at less than a set height and for a set time in the electronic device, the electronic device 100 may set a virtual reference line connecting a set area of each input tool detected according to a switched input mode. That is, as shown in FIGS. 7A and 7B, when eight input tools are detected by the electronic device 100, the electronic device 100 sets virtual reference lines 709 and 710 connecting the outer part of each of the input tools 701 to 708 detected according to a switched input mode.

Herein, the electronic device 100 displays the virtual reference lines 709 and 710 without displaying a set key pad according to the number of detected input tools. That is, as switching into a set input mode, the electronic device 100 displays a key pad set to receive a set text and may display the virtual reference lines 709 and 710 without displaying the set key pad.

Additionally, when a movement of a detected input tool is confirmed, the electronic device 100 confirms that the set virtual reference line moves together each time the input tool moves. That is, as an input tool moves, the electronic device 100 moves the virtual reference lines 709 and 710 together in an area where hovering is detected by the input tool.

Then, the electronic device 100 may receive at least one input tool among a plurality of detected input tools and may receive one content from among at least two contents set to be received from the touch inputted input tool according to a relative length change and a movement direction of the touch inputted input tool and the remaining input tools.

Figure 7C:
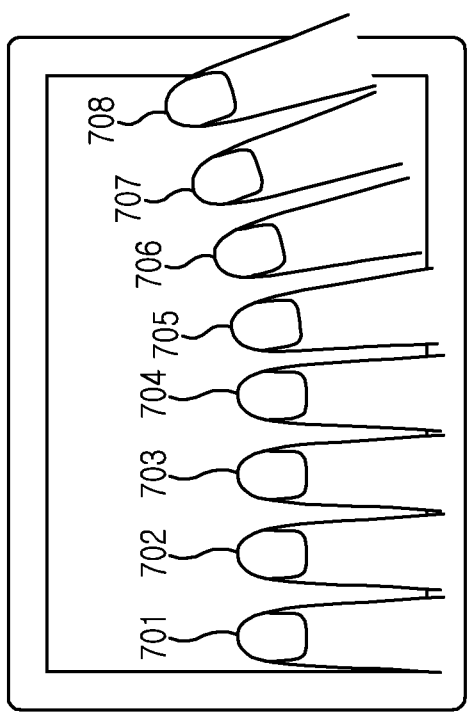
Figure 7D:
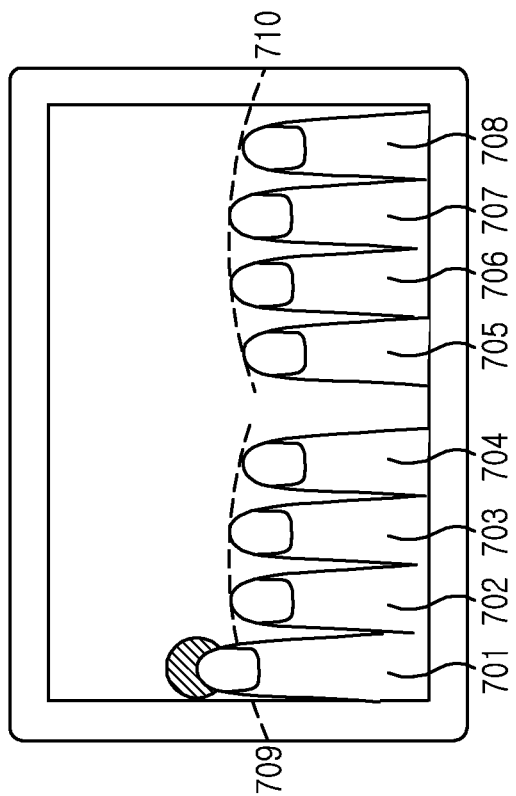

For example, as shown in FIGS. 7B, 7C, and 7D, the electronic device 100 receives the text w, s, and x from a second input tool 702, receives the text e, d, and c from a third input tool 703, and receives the text r, f, v, t, g, and v from a fourth input tool 704, as described below.

Additionally, the electronic device 100 receives the text y, h, n, u, j, and m from a fifth input tool 705, receives the text i and k from a sixth input tool 706, receives the text o and l from a seventh input tool 707, and receives the text p from an eighth input tool 708, as described below.

In the above-mentioned embodiment, while the initial eight input tools 701 to 708 are positioned at the same length, when it is detected that the length of the touch-inputted first input tool 701 is identical to the lengths of the remaining input tools 702 to 709, the text a may be received from among the set text q, a, and z.

In the above-mentioned embodiment, while the initial eight input tools 701 to 708 are positioned at the same length, when it is detected that the length of the touch-inputted first input tool 701 is longer than the lengths of the remaining input tools 702 to 709, the text q may be received from among the set text q, a, and z.

In the above-mentioned embodiment, while the initial eight input tools 701 to 708 are positioned at the same length, when it is detected that the length of the touch-inputted first input tool 701 is shorter than the lengths of the remaining input tools 702 to 709, the text z may be received from among the set text q, a, and z.

Additionally, the electronic device 100 receives an input from the plurality of input tools 701 to 708 simultaneously or sequentially. For example, while the eighth input tool 708 inputs a shift key, the electronic device 100 receives a key for inputting "& and 7" from the fifth input tool 705 to receive the special character "&".

FIGS. 8A-8D are views illustrating when a set text is inputted according to the number of input tools detected by the electronic device 100 according to a third embodiment of the present invention. First, the electronic device 100 may detect the number of input tools positioned on a touch screen, e.g., the touch panel 252, of the electronic device 100. In more detail, the electronic device 100 detects that an input tool is positioned on the touch screen when the input tool is positioned on the touch screen at less than a set height or for more than a set time.

Then, the electronic device 100 switches into one input mode among a plurality of set input modes according to the number of detected input tools. For example, when the number of input tools is three, the electronic device 100 is set to switch into an input mode for inputting a numeric key. When the number of input tools is eight, the electronic device 100 is set to switch into an input mode for inputting a Korean key pad. These cases are described below.

Figure 8A:
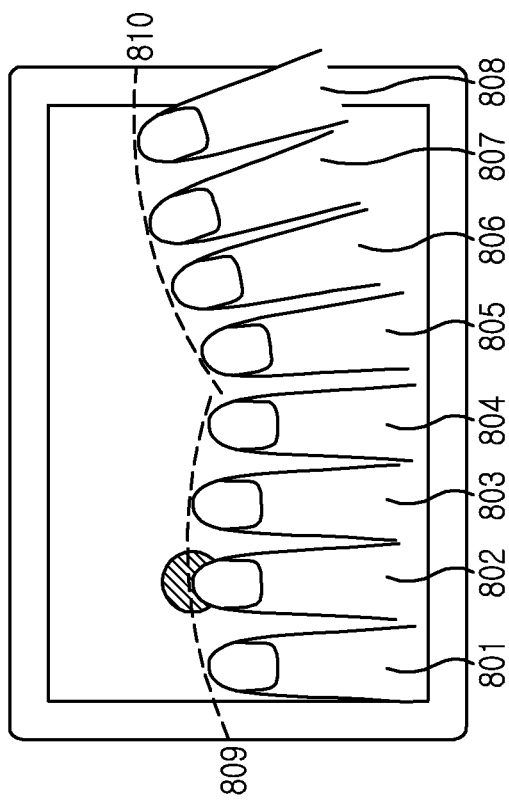
FIGS. 8A-8D are views illustrating when a set text is inputted according to the number of input tools detected by an electronic device, according to the second embodiment of the present invention.
Figure 8B:
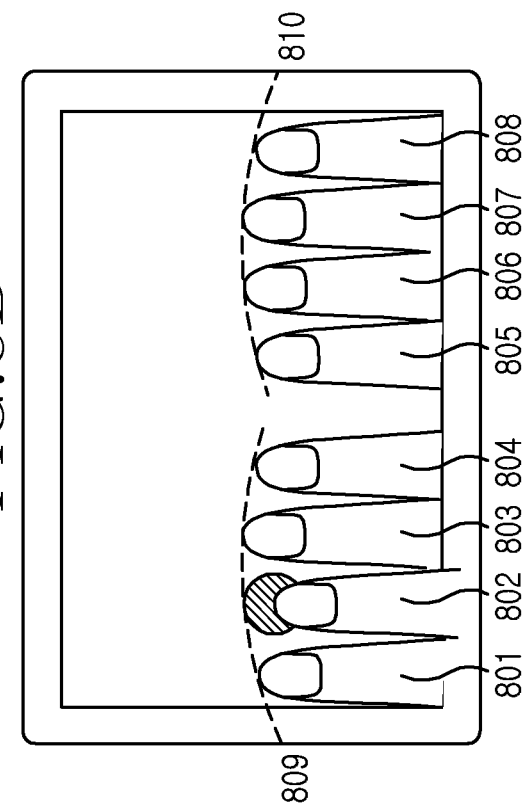

In the above embodiment, when it is determined that the user's eight fingers are positioned on the touch screen at less than a set height and for a set time in the electronic device 100, the electronic device 100 may set a virtual reference line connecting a set area of each input tool detected according to a switched input mode. That is, as shown in FIGS. 8A and 8B, when eight input tools are detected by the electronic device 100, the electronic device 100 may set virtual reference lines 809 and 810 connecting the outer part of each of the input tools 801 to 808 detected according to a switched input mode.

Herein, the electronic device 100 may display the virtual reference lines 809 and 810 without displaying a set key pad according to the number of detected input tools. That is, as switching into a set input mode, the electronic device 100 may display a key pad set to receive a set text and may display the virtual reference lines 809 and 810 without displaying the set key pad.

Additionally, when a movement of a detected input tool is confirmed, the electronic device 100 confirms that the set virtual reference line moves together each time the input tool moves. That is, as an input tool moves, the electronic device 10 moves the virtual reference lines 809 and 810 together in an area where hovering is detected by the input tool.

Then, the electronic device 100 receives at least one input tool among a plurality of detected input tools and receives content from among at least two contents set to be received from the touch inputted input tool according to a relative length change and a movement direction of the touch inputted input tool and the remaining input tools.

Figure 8C:
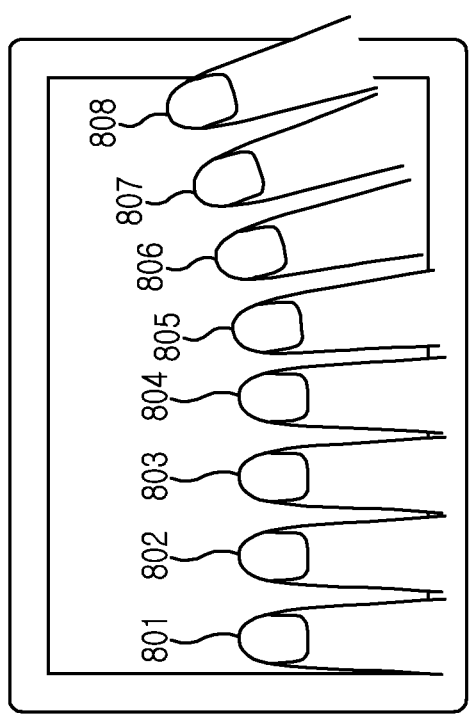
Figure 8D:
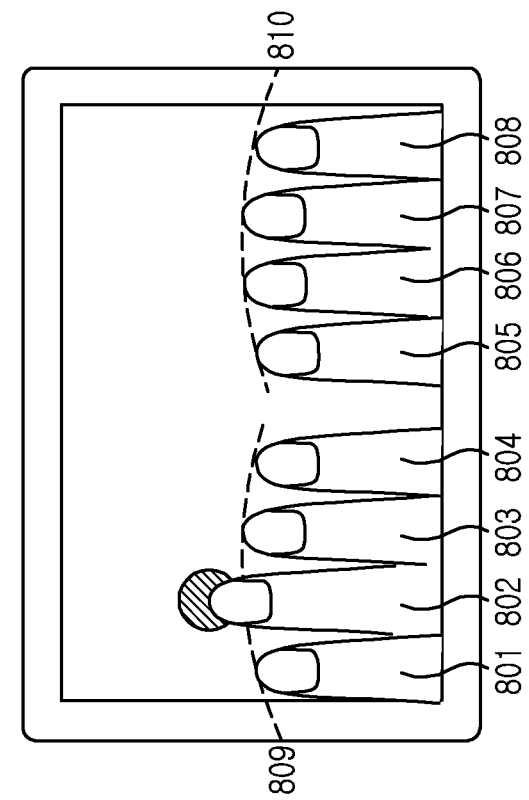

For example, as shown in FIGS. 8B, 8C, and 8D, the electronic device 100 receives the Korean language text " ㅂ, ㅁ, and ㄱ" from a first input tool 801, receives the text "ㅈ, ㄴ, and ㅌ" from a second input tool 802, receives the text "ㄷ, ㅇ, and ㅊ" from a third input tool 803, and receives the text "ㅋ, ㄹ, ㅍ, ㅅ, ㅎ, and ㅠ" from a fourth input tool 804, as described below.

Additionally, the electronic device 100 receives the Korean language text "ㅛ, ㅗ, ㅜ, ㅕ, ㅓ, and ㅡ" from a fifth input tool 805, receives the text "ㅑ and ㅏ" from a sixth input tool 806, receives the text "ㅐ and ㅣ" from a seventh input tool 807, and receives the text "ㅔ" from an eighth input tool 808, as described below.

In the above-mentioned embodiment, while the initial eight input tools 801 to 808 are positioned at the same length, when it is detected that the length of the touch-inputted second input tool 802 is identical to the lengths of the remaining input tools 801 and 803 to 808, the text "ㄴ" may be received from among the set text "ㅈ, ㄴ, and ㅌ".

Similarly, while the initial eight input tools 801 to 808 are positioned at the same length, when it is detected that the length of the touch-inputted second input tool 802 is longer than the lengths of the remaining input tools 801 and 803 to 808, the text "ㅈ" may be received from among the set text "ㅈ, ㄴ, and ㅌ".

Similarly, while the initial eight input tools 801 to 808 are positioned at the same length, when it is detected that the length of the touch-inputted second input tool 802 is shorter than the lengths of the remaining input tools 801 and 803 to 808, the text "ㅌ" may be received from among the set text "ㅈ, ㄴ, and ㅌ".

Figure 9:
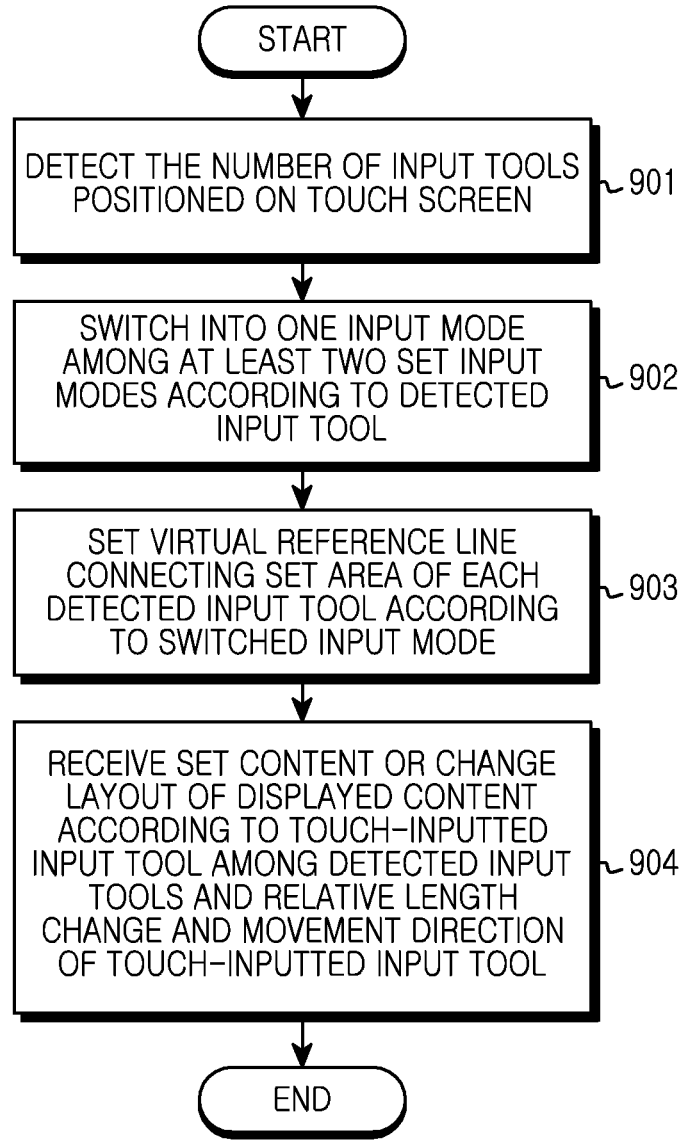
FIG. 9 is a flowchart illustrating an operation order of an electronic device changing an input mode according to an input tool, according to the first embodiment of the present invention.

FIG. 9 is a flowchart illustrating an operation order of the electronic device 100 changing an input mode according to an input tool, according to an embodiment of the present invention. First, as shown in FIG. 9, the electronic device 100 may detect the number of input tools positioned on a touch screen, e.g., the touch screen 252, of the electronic device 100, at step 901. In more detail, the electronic device 100 detects that an input tool is positioned on the touch screen when the input tool is positioned on the touch screen at less than a set height or for more than a set time.

Then, the electronic device 100 switches into one input mode among at least two input modes according to the number of detected input tools, at step 902. For example, when the number of input tools is three, the electronic device 100 is set to switch into an input mode for inputting a numeric key. When the number of input tools is four, the electronic device 100 is set to switch into an input mode for adjusting a layout of a screen. These cases are described below. In the above-mentioned embodiment, when detecting four input tools, the electronic device may switch into an input mode for inputting a numeric key.

Then, the electronic device 100 sets a virtual reference line connecting a set area of each input tool detected according to a switched input mode, at step 903. For example, when detecting an input tool, the electronic device 100 may set a virtual reference line connecting the outer part of each input tool detected according to a switched input mode.

Then, the electronic device 100 receives a set content or change a layout of a displayed content according to a touch-inputted input tool among detected input tools and a relative length change and movement direction of the touch-inputted input tool. For example, while the plurality of initial input tools are positioned at the same length, the electronic device 100 receives each set text according to whether it is detected that the length of a touch-inputted one input tool is identical to, relatively longer than, or relatively shorter than the length of the remaining input tool. Additionally, the electronic device 100 confirms that a touch input is received from each input tool set to change a layout of a screen and is dragged in a set direction and may then change the layout of the screen.

Figure 10:
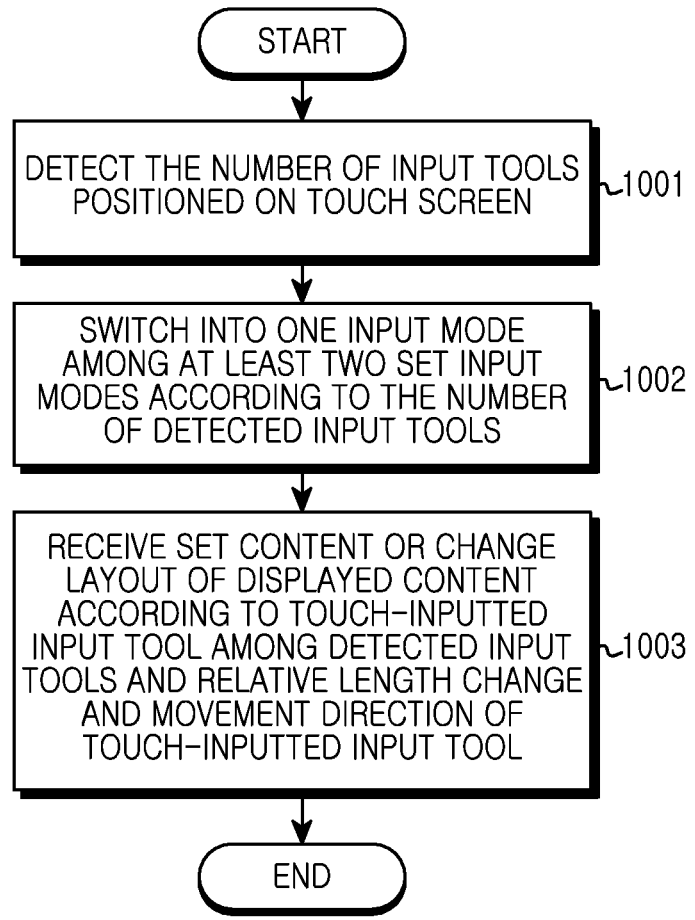
FIG. 10 is a flowchart illustrating a method of an electronic device according to the second embodiment of the present invention.

FIG. 10 is a flowchart illustrating a method of the electronic device 100, according to an embodiment of the present invention. First, as shown in FIG. 10, the electronic device 100 detects the number of input tools positioned on a touch screen, e.g., the touch panel 252, of the electronic device 100, at step 1001. In more detail, the electronic device 100 detects that an input tool is positioned on the touch screen when the input tool is positioned on the touch screen at less than a set height or for more than a set time.

Then, the electronic device 100 switches into one input mode among at least two input modes according to the number of detected input tools, at step 1002. For example, when the number of input tools is three, the electronic device 100 is set to switch into an input mode for inputting a numeric key. When the number of input tools is four, the electronic device 100 is set to switch into an input mode for adjusting a layout of a screen. These cases are described below. In the above-mentioned embodiment, when detecting four input tools, the electronic device 100 switches into an input mode for inputting a numeric key.

Then, the electronic device 100 receives a set content or change at least one layout of a displayed content according to a touch-inputted input tool among detected input tools and a relative length change and movement direction of the touch-inputted input tool, at step 1003. For example, while the plurality of initial input tools are positioned at the same length, the electronic device 100 receives each set text according to whether it is detected that the length of at least one touch-inputted input tool is identical to, relatively longer than, or relatively shorter than the length of the remaining input tool. Additionally, the electronic device 100 confirms that a touch input is received from each input tool set to change a layout of a screen and is dragged in a set direction and may then change the layout of the screen.

It will be appreciated that embodiments of the present invention according to the claims and description in the specification can be realized in the form of hardware, software or a combination of hardware and software.

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method in an electronic device, the method comprising:
   detecting a hovering event by a plurality of input tools on a touch screen at a first time;
   switching to one input mode corresponding to a number of the plurality of input tools among at least two input modes;
   displaying a virtual reference line for the plurality of input tools according to the switched one input mode;
   detecting a touch input by a first input tool among the plurality of input tools at a second time; and
   displaying a content based on a first length associated with the first input tool and a second length associated with at least one second input tool which is in a hovering state at the second time among the plurality of input tools and the virtual reference line,
   wherein the first length is determined based on a first position of the first input tool at the first time and a second position of the first input tool at the second time,
   wherein the second length is determined based on a third position of the second input tool at the first time and a fourth position of the second input tool at the second time, and
   wherein a display area of the virtual reference line is changed in response to detecting a change of an area where hovering over the touch screen is detected.

2. The method of claim 1, wherein detecting the hovering event comprises, when the first input tool is positioned on the touch screen at less than a set height and for more than a set time, detecting the plurality of input tools.

3. The method of claim 1, further comprising displaying a key pad corresponding to the switched one input mode in a first area where hovering over the touch screen is detected by the first input tool.

4. The method of claim 3, further comprising, if the first area where hovering over the touch screen is detected is changed to a second area, changing a display area of the key pad from the first area to the second area.

5. The method of claim 1, wherein displaying the content comprises:
   determining a movement direction of the first input tool: and
   displaying the content corresponding to the movement direction.

6. The method of claim 1, wherein the second input tool comprises an input tool which a touch input is not detected at the second time.

7. The method of claim 1, wherein displaying the content comprises:
   comparing the first length and the second length:
   when the first length is longer than the second length, displaying a first content among a plurality of contents associated with the first input tool and the switched one input mode;
   when the first length is equal to the second length, displaying a second content among the plurality of contents associated with the first input tool and the switched one input mode; and
   when the first length is shorter than the second length, displaying a third content among the plurality of contents associated with the first input tool and the switched one input mode.

8. The method of claim 1, wherein displaying the content comprises:
   changing at least one layout of the content based on the first length, the second length and the switched one input mode.

9. The method of claim 8, wherein changing the at least one layout of the content comprises changing at least one of a font, a font size, a thickness, a color, a transparency, and a display type of the content.

10. An electronic device comprising:
a display;
at least one processor; and
a memory configured to store instructions that, when executed, cause the processor to:
  detect a hovering event by a plurality of input tools on a touch screen at a first time,
  switch to one input mode corresponding to a number of the plurality of input tools among at least two input modes,
  display a virtual reference line for the plurality of input tools according to the switched one input mode,
  detect a touch input by a first input tool among the plurality of input tools at a second time, and
  display a content based on a first length associated with the first input tool and a second length associated with at least one second input tool which is in a hovering state at the second time among the plurality of input tools and the virtual reference line,
wherein the first length is determined based on a first position of the first input tool at the first time and a second position of the first input tool at the second time,
wherein the second length is determined based on a third position of the second input tool at the first time and a fourth position of the second input tool at the second time, and
wherein the processor is configured to change a display area of the virtual reference line from a first area to a second area if an area where hovering over the touch screen is detected is changed from the first area to the second area.

11. The device of claim 10, wherein when the first input tool is positioned on the touch screen at less than a set height and for more than a set time, the processor detects the hovering event.

12. The device of claim 10, wherein the processor is configured to control the display to display a key pad corresponding to the switched one input mode in the first area where hovering over the touch screen is detected.

13. The device of claim 12, wherein, if the first area where hovering over the touch screen is detected is changed to the second area, the processor is configured to change a display area of the key pad from the first area to the second area.

14. The device of claim 10, wherein the processor is configured to determine a movement direction of the first input tool, and control the display to display the content corresponding to the movement direction.

15. The device of claim 10, wherein the second input tool comprises an input tool which a touch input is not detected at the second time.

16. The device of claim 10, wherein the processor is configured to:
  compare the first length and the second length;
  when the first length is longer than the second length, control the display to display a first content among a plurality of contents associated with the first input tool and the switched one input mode;
  when the first length is equal to the second length, control the display to display a second content among the plurality of contents associated with the first input tool and the switched one input mode; and
  when the first length is shorter than the second length, control the display to display a third content among the plurality of contents associated with the first input tool and the switched one input mode.

17. The device of claim 10, wherein the processor is configured to change at least one layout of the content based on the first length, the second length and the switched one input mode.

18. The device of claim 10, wherein the processor is configured to change at least one of a font, a font size, a thickness, a color, a transparency, and a display type of the content.

* * * * *